No. 776,602. PATENTED DEC. 6, 1904.
W. E. LAWRENCE.
HACKSAW.
APPLICATION FILED DEC. 2, 1903.
NO MODEL.
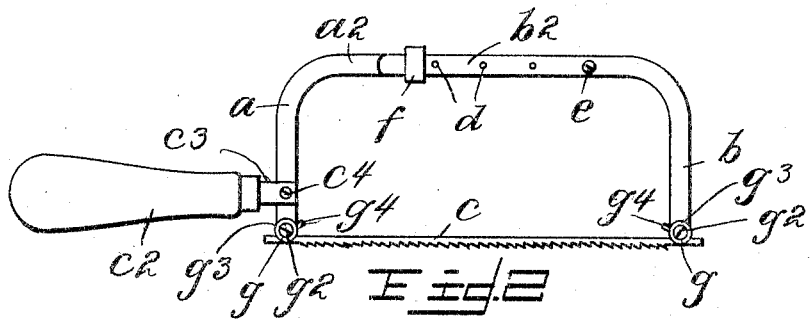
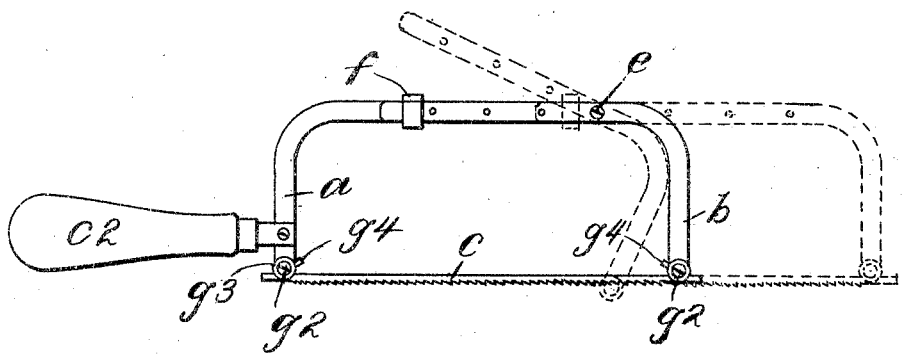
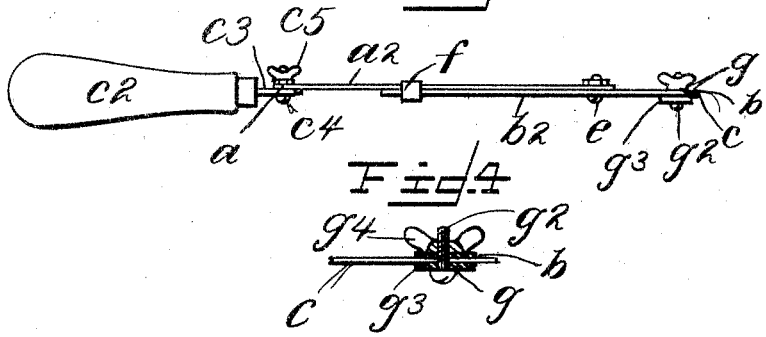
WITNESSES
F. A. Stewart
C. E. Mulreany
INVENTOR
William E. Laurence
BY Edgar Tate & Co
ATTORNEYS No. 776,602. Patented December 6, 1904.

UNITED STATES PATENT OFFICE.

WILLIAM E. LAWRENCE, OF BROOKLYN, NEW YORK, ASSIGNOR TO THE OOZER MANUFACTURING COMPANY, OF JERSEY CITY, NEW JERSEY, A CORPORATION OF NEW JERSEY.

HACKSAW.

SPECIFICATION forming part of Letters Patent No. 776,602, dated December 6, 1904.

Application filed December 2, 1903. Serial No. 183,426. (No model.)

*To all whom it may concern:*

Be it known that I, WILLIAM E. LAWRENCE, a citizen of the United States, residing at Brooklyn, in the county of Kings and State of New York, have invented certain new and useful Improvements in Hacksaws, of which the following is a specification, such as will enable those skilled in the art to which it appertains to make and use the same.

This invention relates to hacksaws; and the object thereof is to provide improved frames or holders for saws of this class, whereby the saw may be more conveniently connected with the frame or holder and also be held taut at all times.

The invention is fully disclosed in the following specification, of which the accompanying drawings forms a part, in which the separate parts of my improvement are designated by suitable reference characters in each of the views, and in which—

Figure 1 is a side view of a hacksaw made according to my invention; Fig. 2, a similar view showing the parts in a different position; Fig. 3, a plan view of the device as shown in Fig. 1, and Fig. 4 a sectional view of a detail of the construction.

In the practice of my invention as shown in the drawings I provide a hacksaw-frame composed of two similar members $a$ and $b$, each of which is substantially L-shaped in form, said members $a$ and $b$ being provided with a member $a^2$ and $b^2$, respectively, which are substantially at right angles to the main parts of said members, with which the saw $c$ is connected. Connected with one of the members $a$ and $b$, preferably the member $a$, as shown in the drawings, is a handle $c^2$, and this connection is preferably made as shown in the drawings, but may be made in any desired manner, and, as shown in the drawings, the handle $c^2$ is provided with a shank $c^3$, which is connected with the member $a$ of the frame by a screw $c^4$, provided with a nut $c^5$.

The part $a^2$ of the frame member $a$ and the part $b^2$ of the frame member $b$ are provided with holes $d$, which are arranged at regular intervals and through which is passed a pivot screw, pin, or bolt $e$, and by means of this construction the length of the saw-frame may be adjusted longitudinally, as will be readily understood, and mounted on the frame member $a$ is a link-shaped or other keeper $f$, which is adapted to be moved so as to inclose the parts $a^2$ and $b^2$ of the members $a$ and $b$ of the frame, and this keeper is designed to hold said members in operative position, as shown in Fig. 1.

In practice the saw $c$ is connected with the frame members $a$ and $b$, as shown at $g$, this connection being made in the construction shown by means of a screw $g^2$, a washer $g^3$, and a nut $g^4$; but this connection may be made in any desired manner.

The frame member $b$ is free to turn on its pivotal connection with the frame member $a$, as indicated in dotted lines in Fig. 2, and in practice the keeper $f$ is moved so that it will not engage the part $b^2$ of the frame member $b$, and said frame member $b$ is turned into the position shown in Fig. 2, or approximately so. The saw $c$ is then connected with the frame members $a$ and $b$, after which the frame member $b$ is swung into the position shown in Fig. 1 and locked in said position by the keeper. This operation holds the saw $c$ taut, and it will be apparent that the mounting of the saw in the frame or the securing of said saw in said frame in the manner described may be repeated whenever necessary in order to tighten the saw, and it will also be apparent that a new saw may be substituted for an old one whenever desired.

It is a well-known fact that saws of this class are made of spring material and very fine and are liable to bend and twist; but by my improvement I provide means whereby the ends of the saw may be secured and the saw tightened or made taut, and thus prevent, at least to an extent, the twisting or bending of the saw, and by providing a frame which is adjustable longitudinally I also am enabled to use a longer or a shorter saw, as may be desired.

Having fully described my invention, what I claim as new, and desire to secure by Letters Patent, is—

A hacksaw-frame composed of two members which are substantially L-shaped in form, parts thereof being parallel with the saw-blade when the latter is in position, said parts being also provided at intervals with holes, a pivot pin or screw adapted to be passed through said holes, a keeper mounted on one of said parts and adapted to engage and hold the other, and a handle connected to one of said members, the connection of the separate members being such that the free ends thereof may approach each other, substantially as shown and described.

In testimony that I claim the foregoing as my invention I have signed my name, in presence of the subscribing witnesses, this 30th day of November, 1903.

WILLIAM E. LAWRENCE.

Witnesses:
F. A. STEWART,
C. J. KLEIN.